Figure 1:
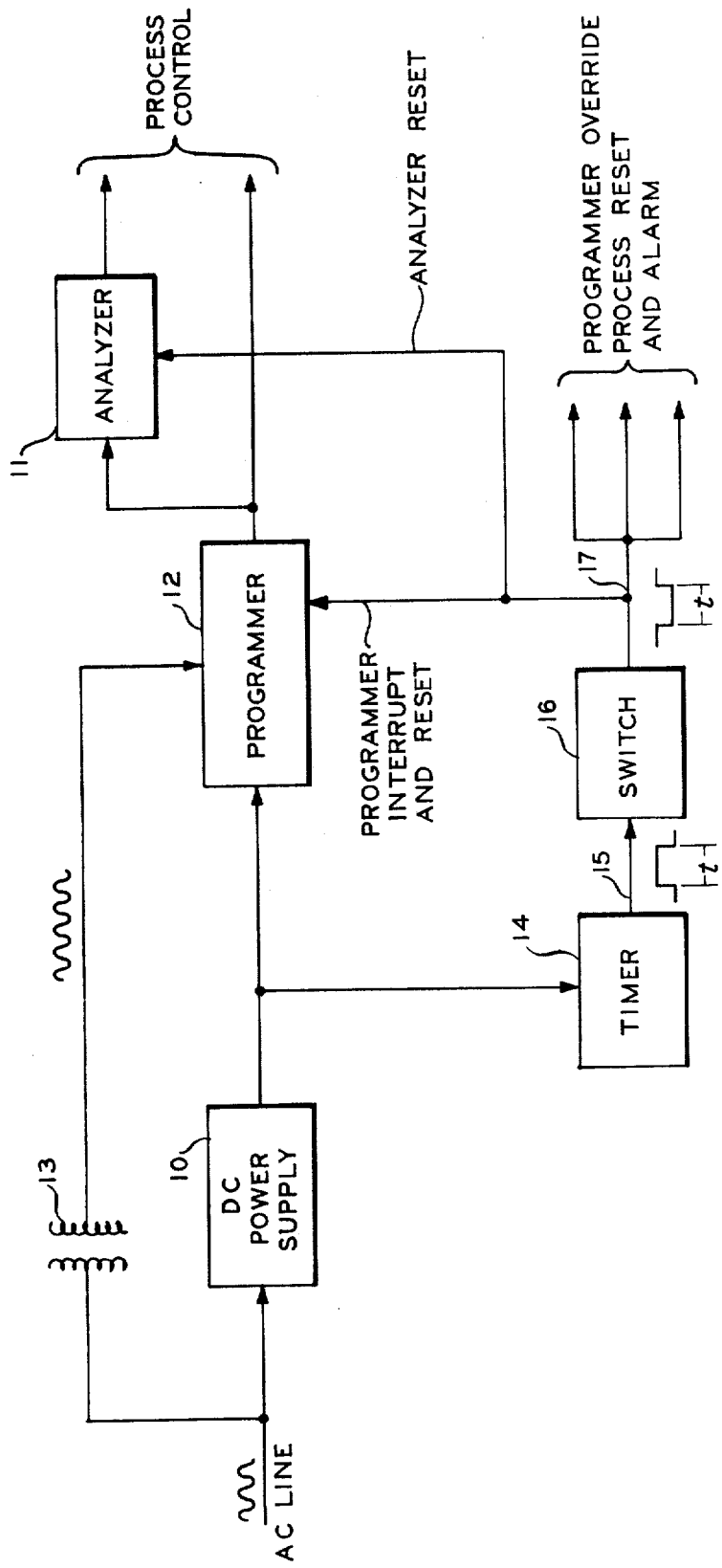

United States Patent [19]  [11] 3,890,494
Meshek et al.  [45] June 17, 1975

[54] APPARATUS AND METHOD FOR ALTERING PROCESS CONTROL IN RESPONSE TO A POWER INTERRUPTION

[75] Inventors: Harry M. Meshek, Bartlesville; Vern A. Street, Tulsa, both of Okla.

[73] Assignee: Phillips Petroleum Company, Bartlesville, Okla.

[22] Filed: Mar. 28, 1974

[21] Appl. No.: 455,738

[52] U.S. Cl. ........ 235/153 R; 235/151; 235/151.35; 317/36 TD
[51] Int. Cl. .......................................... G05b 19/00
[58] Field of Search ........... 235/151, 151.21, 153 R, 235/153 A; 317/9, 16, 36 TD; 340/213 Q, 248 A, 248 B, 253 C, 253 M, 336

[56] References Cited
UNITED STATES PATENTS

| | | |
|---|---|---|
| 3,608,301 | 9/1971 | Loewengart ................ 340/248 B X |
| 3,657,603 | 4/1972 | Adams ........................ 317/36 TD X |
| 3,678,499 | 7/1972 | McCarty ..................... 340/253 C X |
| 3,794,858 | 2/1974 | Squiers ....................... 317/36 TD X |
| 3,809,963 | 5/1974 | Hutchinson ................ 317/36 TD X |
| 3,824,383 | 7/1974 | Inose et al ..................... 235/153 R |

Primary Examiner—Eugene G. Botz
Assistant Examiner—R. Stephen Dildine, Jr.

[57] ABSTRACT

Apparatus and method are disclosed whereby loss of power to a process control system will result in overriding the process control system for a preselected time following the restoration of power at the end of the power interruption. In a preferred embodiment, loss of power to a digital programmer controlling at least one chromatographic analyzer results in isolation of the chromatographic analyzer from the sample source upon restoration of the power, backflushing the chromatographic analyzer column and resetting the digital programmer.

18 Claims, 2 Drawing Figures

APPARATUS AND METHOD FOR ALTERING PROCESS CONTROL IN RESPONSE TO A POWER INTERRUPTION

This invention relates to apparatus and method for altering a process control system in response to an interruption of electrical power to the control system. In another aspect it relates to apparatus and method for overriding a process control system for a preselected period of time in response to an interruption of electrical power to said process control system. In still another aspect it relates to apparatus and method for using the return of power to a process control system to trigger alteration of the process control system. In another aspect the invention relates to apparatus and method for overriding and resetting a digital programmer following loss of power to the programmer. In still another aspect it relates to apparatus and method for controlling at least one chromatographic analyzer.

Many processes or manufacturing operations can be controlled by means of a process control system which directs sequential steps in the process or operation or varies the operating parameters of the process or operation in response to changing conditions which affect the efficiency or operability of the process or operation. Of the many types of process control systems available, all require some source of power. In some systems, the power may be derived from the process or operation itself as, for example, a float which is adapted by mechanical linkage to close a valve when liquid in a reservoir reaches a desired level. A substantial number of more sophisticated control systems, however, utilize some external source of electrical power to produce the mechanical motion and/or electrical signals necessary to control a process or operation. In many such systems there exists a possibility that an interruption of electrical power to the process control system will result in generation of erroneous control signals. In particular, many digital electronic devices such as a digital counter or programmer which uses information stored in a digital format to control a process or a sequence of operations, such as a digital clock or sequence programmer, may generate an erroneous control signal as a result of the resetting of a counter, loss of stored memory, or other similar signal loss resulting from an interruption in operating power.

It is therefore an object of this invention to provide an apparatus and a method for altering a process control system in response to an interruption of electrical power to the control system. Another object is to provide an apparatus and method for overriding a process control system for a preselected period of time in response to an interruption of electrical power to said process control system. A further object is to provide an apparatus and method for using the return of power to a process control system to trigger alteration of the process control system. Yet another object of the invention is to provide an apparatus and method for overriding and resetting a digital programmer following loss of power to the programmer. Still another object is to provide an apparatus and method for controlling at least one chromatographic analyzer.

In accordance with the invention, a timing means having a trigger input for accepting a preselected trigger signal and an output means for producing a timed output signal of preselected duration in response to the trigger signal is associated with a trigger signal generating circuit which senses an interruption in the power supplied to a process control system. When an interruption in the power supply to the process control system occurs, the trigger signal generating means generates a trigger signal which is utilized by the timing means to initiate a timed output signal of preselected duration. The timed output signal is used to activate means for overriding the process control system and maintaining or returing to a process condition at which control can be returning to the process control system.

The invention can be utilized with virtually any electrically powered process control system and can be used to respond to interruptions in electrical power of almost any duration. The invention is particularly useful, however, in responding to relatively short interruptions which, although they might not be noticed by human observation and might not be of sufficient duration or magnitude to trigger conventional alarm systems, are of sufficient duration and magnitude to cause partial loss of digital memory, resetting of a digital counter, loss of a signal being transferred from one piece of digital equipment to another, or other similar loss of information. Although the invention can utilize a power supply separate from the process control system power supply, it is particularly useful for its ability to operate using, as its only source of power, the power supply which it monitors and its ability to assume control following a power interruption even though the apparatus itself has been without power during the interruption. Triggering and timing of the timed output signal incorporates nondigital techniques in order to prevent the apparatus of the invention from being susceptible to the same errors as the digital counting or computing equipment which it can be used to override.

Figure 2:
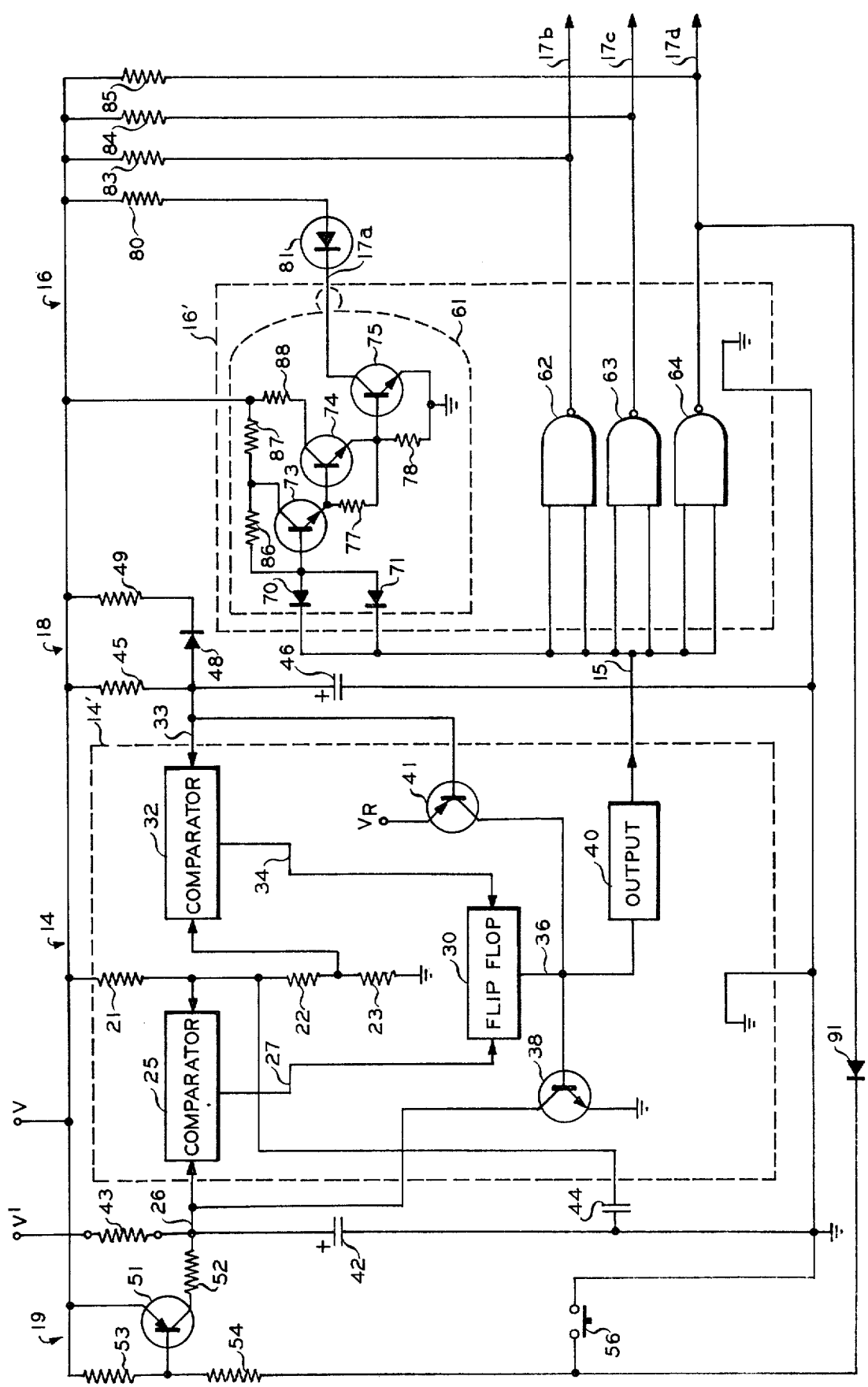

Other objects and advantages of the invention will be apparent from a description of the drawing in which:

FIG. 1 is a schematic block diagram of a preferred embodiment of the invention, and FIG. 2 is a schematic representation of preferred timer, switch, trigger and reset means which can be utilized in conjunction with the invention.

Referring now to the drawing in detail, FIG. 1 illustrates a schematic block diagram of a portion of a process control system utilizing a preferred embodiment of the method and apparatus of the invention. A DC power supply 10 is powered by a standard AC power line and in turn provides DC power to a process programmer 12. Although the invention is adaptable for use with nearly any programmer, it is particularly suited for use with a programmer which controls sequential steps in a process or operation. A programmer 12 having an internal clock which is utilized in sequential control of process steps may have its own internal pulse generating means for operating the clock or may be provided with external pulse generating means such as a low voltage 60-cycle alternating current derived from the AC power source by a transformer 13. Programmer 12 is productive of one or more process control signals which can be utilized to maintain operation of a process in accordance with preselected standards. A preferred programmer of the type disclosed in U.S. Pat. No. 3,732,466, for example, provides a series of output signals in a preselected sequence in response to elapsed time as measured by an internal clock. The sequential process control signals can be used to operate a chromatographic analyzer 11 by sequentially opening and closing various valves, and making other adjustments to insure that an accurate automatic analysis is made.

A timer 14 senses interruptions in the output of the DC power supply 10 and, in response to the termination of a power supply interruption which could cause an error in the operation of the programmer 12, produces an output signal 15 of time duration $t$. The time duration t of the timed output signal 15 is selected to permit the process controlled by the programmer 12 to be returned to a predetermined reset condition. At the occurrence of the timed output signal 15, control of the process by the programmer 12 is interrupted and signal 17 is generated to override programmer control of the process, reset the process and/or analyzer 11 to a preselected condition, produce an alarm signal, reset the programmer 12, and perform such other functions as may be necessary or desirable.

In the preferred embodiment illustrated in FIG. 1, the output of the timer 14 is ordinarily grounded, and a predetermined fixed voltage is generatd as timed output signal 15 when a power supply interruption is detected. A switch means is then used to invert the output signal of the timing means 14 to provide an interrupt control signal 17 which is normally a fixed voltage but which is grounded when interruption of the power supply has been detected. The interrupt control signal 17 is of the same duration $t$ as timed output signal 15. Use of such a switch arrangement or other similar signal conditioning means to modify signal 15 yields a system which, by requiring a voltage to be generated before change of process control is initiated and by exercising process override control in response to the disappearance of a signal, eliminates, to the greatest extent possible, control errors resulting from equipment malfunction extraneous"noise" signals and other similar error-causing conditions.

FIG. 2 illustrates preferred circuits for the timing means 14 and the switch means 16 of FIG. 1. FIG. 2 also illustrates a preferred timer triggering means 18 and timer reset means 19.

In the timing circuit 14, three resistors, 21, 22, and 23 are connected in series between a positive DC voltage source V and ground. A first comparator 25 compares a reference voltage measured between resistor 21 and resistor 22 with a threshold voltage signal 26 and produces an output signal 27 which sets a bistable multivibrator or flipflop 30 in a first position whenever the threshold voltage signal 26 exceeds the reference voltage measured between resistors 21 and 22. Comparator 32 compares a reference voltage measured between resistors 22 and 23 with a trigger voltage signal 33 and generates an output signal 34 which sets the flipflop 30 to a second position whenever the trigger voltage signal 33 is less than the reference voltage measured between resistors 22 and 23.

When the flipflop 30 is in its first position, its output signal 36 biases the base of transistor 38 so that transister 38 conducts electricity from its collector, connected to threshold voltage signal 26, through the transistor to its emitter which is connected to ground. When flipflop 30 is in its second position, its output signal 36 biases the base of transistor 38 so that transistor 38 ceases to provide a low resistance current path from its collector to its emitter and permits threshold voltage signal 26 to be maintained at a voltage above ground. The timer output stage 40 generates a preselected voltage signal 15 when the flipflop 30 is in its second position and produces a grounded output when the flipflop 30 is in its first position. Flipflop 30 is automatically maintained in its first position following a signal 27 from comparator 25 until it receives a signal 34 from a second comparator 32 to put it in its second position. Likewise, it will remain in its second position until a signal 27 from comparator 25 puts it back into its first position.

The timer also contains a transistor 41 which is connected at its emitter to an internal reference voltage $V_R$ generated by the timer circuit and at its collector to the output of flipflop 30 so that when transistor 41 is in a conducting state the base of transistor 38 is biased to permit transistor 38 to conduct and threshold voltage signal 26 to be grounded. Reference voltage $V_R$ can be any voltage which is less than voltage V and sufficient to bias the base of transistor 38 to cause transistor 38 to conduct. In order to prevent unwanted operation of reset transistor 41 its base is connected to trigger voltage signal 33 thereby also preventing unwanted grounding of the voltage reference signal 26. In addition transistor 41 grounds signal 26 and discharges the timing capacitor 42 in the event that a second power interruption takes place while capacitor 42 is being charged in response to a previous power interruption.

Resistors 21, 22, and 23 along with first comparator 25, second comparator 32, flipflop 30, transistor 38, output stage 40, and transistor 41 may be in the form of an integrated circuit 14' such as the Signetics NE 555 timer, Signetics Corp., Sunnyvale, Calif, or may be assembled from standard components. The Signetics NE 555 timer is also equipped with a control voltage terminal connected between resistors 21 and 22. This control voltage terminal is unused in the present invention and is connected to ground across filter capacitor 44 to filter out unwanted signals.

Trigger circuit 18 comprises a resistor 45 in series with a trigger capacitor 46. The end of resistor 45 opposite trigger capacitor 46 is connected to the DC voltage source V and the side of capacitor 46 opposite resistor 45 is connected to ground. The voltage source V across which the series combination of resistors 45 and trigger capacitor 46 are connected must be the supply voltage for the programmer 12 or some other voltage having a direct relationship to the supply voltage for the programmer 12. In the preferred embodiment illustrated, the supply voltage V provided to the timer 14, the switch 16, the trigger circuit 18, and the reset circuit 19 is the same voltage which operates the programmer 12. If desired, an independent voltage source may be used to operate the timer 14, the switch 16 and the reset circuit 19, but the voltage supplied to the trigger circuit 18 must be the same voltage which is used to power the programmer 12 or must be a voltage which performs in a fixed relationship to the voltage supplied to the programmer 12 so that all power interruptions appearing in the power supply to the programmer 12 will also appear in the voltage supplied to the trigger circuit 18. The series combination of a diode 48 and a resistor 49 is connected in parallel with the resistor 45 with the diode 48 being biased to permit the trigger capacitor 46 to discharge through resistor 49 and to prohibit charging of the trigger capacitor 46 through resistor 49.

The timer threshold voltage signal 26 is measured across timing capacitor 42 which is charged through timing resistor 43 from a voltage source $V'$. Although it is within the scope of the invention to utilize the same voltage source V for charging the timing capacitor 42 and for operating the rest of the timer 14, the use of a voltage V' higher than the supply voltage V for charging the timing capacitor 42 permits additional accuracy, particularly when substantial charging tims are involved. For example, a medium-quality capacitor having a normal leakage current could be difficult to charge to a preselected threshold voltage if, as the charge on the capacitor approached the desired voltage, the charging current would be reduced to a value not significantly larger than the leakage current as the voltage across the charging resistor decreased. Under such circumstances a more expensive, high-quality capacitor would be necessary for use as timing capacitor 42. Use of a higher charging voltage V' maintains a larger voltage drop across the charging resistor 43 and, although a lower initial charging rate may be necessary to arrive at the preselected trigger voltage in the same total charging time, the decrease in charging rate from the time that charging is commenced to the time that the desired threshold voltage signal 26 is produced will be less significant. Use of a higher charging voltage V' will therefore permit the use of a more economical charging capacitor 42 without sacrificing the accuracy or reliability of the charging time. Any suitable voltage source V' higher than the voltage source V can be used. Suitable examples would be a rechargeable storage battery or a second voltage provided by the DC power supply 10.

In the reset circuit 19 the emitter of transistor 51 is connected to the voltage source V, and the collector of transistor 51 is connected through resistor 52 to the common connection of resistor 43 and timing capacitor 42 so that when transistor 51 is in a conducting state, additional charging current will flow from voltage source V through resistor 52, and the charging rate of the timing capacitor 42 will be increased. Bias resistors 53 and 54 are connected in series between the voltage source V and the ungrounded side of reset switch 56 with the base of transistor 51 connected between resistor 53 and 54. When reset switch 56 is closed, resistors 53 and 54 bias the base of transistor 51 so that electricity is conducted from the voltage source V through the transistor 51 and resistor 52 to timing capacitor 42. The resistance of resistor 52 is preferably chosen to permit a flow of current sufficient to charge the timing capacitor 42 to the desired threshold voltage within a short time after reset switch 56 is closed. The charging time for timing capacitor 42 with reset 56 closed is preferably less than one second, more preferably less than 0.1 second, and should be less than one-tenth of the time required for timing capacitor to charge to the same threshold voltage with reset switch 56 open, preferably less than 1/100 of the charging time with reset switch 56 open, and more preferably less than 1/1000 of the charging time with reset switch 56 open.

Switching means 16 comprises a plurality of NAND circuits 61, 62, 63, and 64. The timed output signal 15 is applied to both inputs of each NAND circuit 61, 62, 63, and 64 so that each NAND circuit produces a switched output signal 17a, 17b, 17c and 17d which is the opposite of the timed output signal 15. i.e., when signal 15 is grounded a voltage will appear at signal 17a, 17b, 17c, and 17d and when a voltage appears at signals 15, signal 17a, 17b, 17c, and 17d will be grounded. A schematic of a typical NAND circuit is illustrated for NAND circuit 61. The circuits of 62, 63, and 64 are identical.

When signal 15 is grounded the input diodes 70 and 71 of the NAND circuit ground the base of transistor 73 thereby preventing current flow through transistor 73. Transistors 74 and 75 are maintained in a nonconducting state by the absence of current flow through and resulting bias voltage across resistors 77 and 78. As a result, the collector of transistor 75 and output of NAND circuit 61 are maintained at voltage V by resistor 80 and light emitting diode 81. In the case of NAND circuits 62, 63, and 64, outputs 17b, 17c, and 17d are maintained at voltage V by resistors 83, 84, and 85 respectively.

When signal 15 applies a preselected voltage to the NAND circuit inputs, current flow through resistor 86 decreases and the base of transistor 73 is biased to a conducting state. Current flow through resistor 87, transistor 73, and resistor 77 raises the voltage across resistor 77 and biases transistor 74 to a conducting state permitting current to flow through resistor 88 and transistor 74. The combined current flow through resistor 78 provides a bias at the base of transistor 75 which permits current to flow from the voltage source V, through resistor 80, light emitting diode 81, the collector of transistor 75, and the emitter of transistor 75 to ground, thereby grounding the output of NAND circuit 61 and causing the light emitting diode 81 to indicate that a programmer override situation is present. In a similar manner NAND circuits 62, 63, and 64 ground signals 17b, 17c and 17d when a preselected voltage is applied to their inputs by timed output signal 15. Although the use of four NAND circuits is illustrated in FIG. 2, fewer or more circuits may be utilized as necessary or desirable in order to provide adequate process and/or analyzer control. A group of four NAND circuits such as NAND circuits 61, 62, 63, and 64 can be in the form of an integrated circuit 16' such as the MC 858 P manufactured by Motorola Semiconductor Products, Inc., Phoenix, Ariz., or can be assembled from available components.

Although the need will vary depending on the type of DC power supply employed, the electronic environment in which the apparatus and method of the invention is used, and other similar conditions, a power bypass capacitor (not shown) connected between the voltage source V and ground is preferred. A suitable capacitor for use with the illustrated circuit, for example, would be a 2.2 MFD capacitor.

In operation, the flipflop 30 of timer 14 is ordinarily in its first position and timer output stage 40 produces a grounded output signal 15. Switch output signals 17a, 17b, 17c and 17d are maintained at a voltage determined by the source voltage V. Signals 17b, 17c, and 17d would be affected by the current flow, if any, through resistors 83, 84, and 85. In this condition the light emitting diode 81 is not lighted, and the logic elements or other apparatus which receive signals 17b, 17c and 17d are conditioned to permit control of a process such as automatic chromatographic analysis of a sample by the programmer 12 as it generates sequential signals to initiate sample collection, carrier gas flow, detector zeroing, backflushing, or other operations associated with chromatographic analysis or any other process which is being controlled. If a substantial power interruption of the AC line power supplying the DC power supply occurs, or if there is a failure in the DC power supply, the voltage V supplied to the programmer 12, the timer 14, the switch 16, the trigger circuit 18, and the reset circuit 19 will drop to zero.

When the power interruption is over and the DC power supply 10 again provides the programmer 12, the timer 14, the switch 16, the trigger circuit 18, and the reset circuit 19 with a voltage V, the internal circuits of the timer 14 are immediately supplied with their usual power source, the first comparator 25, second comparator 32, flipflop 30, transistor 38, output stage 40 and other internal mechanisms are prepared to operate, and reference voltages are established between resistors 21 and 22 and between resistors 22 and 23.

Simultaneous with the return of power to supply the programmer 12 and the timer 14, the power supply voltage V is applied across the series combination of resistor 45 and trigger capacitor 46. The sizes of trigger capacitor 46 and resistor 45 are chosen so that the trigger capacitor 46 will charge slowly enough to provide a suitable trigger signal 33 after the internal circuits of the timer 14 are fully operative. For example, if a trigger signal voltage 33 of less than 1⅔ volts is necessary to cause the second comparator 32 to produce an output 34, the sizes of resistor 45 and trigger capacitor 46 are chosen so that the trigger capacitor 46 will not charge to one and two-thirds volts until after the application of the voltage V to the timing circuit 14 has made the internal circuits of the timing circuit operative.

As soon as the second comparator 32 is operative and senses a trigger voltage 33 which is less than the reference voltage between resistors 22 and 23, it produces an output signal 34 which sets the flipflop 30 to its second position wherein the flipflop output signal 36 causes transistor 38 to be in a non-conducting state and causes the output stage 40 to produce a preselected voltage signal as timed output signal 15.

Application of the voltage of timed output signal 15 to the inputs of NAND circuits 61, 62, 63 and 64 causes the outputs of the NAND circuits to be grounded which in turn causes the light emitting diode 81 to conduct and become lighted, thereby indicating that a power interruption has occurred and that the signals required to override the programmer 12 and reset the process are being generated. Grounded signals 17b, 17c, and 17d are utilized to initiate the various programmer override analyzer reset and other process reset operations which are necessary or desirable. In the case of a programmer 12 which controls the sequence of events in automatic chromatographic analysis of a process stream, for example, signal 17b may be used to inhibit the taking of a sample to be analyzed by insuring that a sampling valve is switched to or held in a position in which the sample bypasses the chromatographic column. Signal 17c may be used to simultaneously insure that another valve or set of valves maintains a backflush condition through the chromatographic column in order to clear the column of any partially eluted sample which might cause an erroneous analyzer output. Signal 17d could be used to maintain the programmer 12 in a reset condition.

When the flipflop 30 has been set to its second condition by the output signal 34 of the second comparator 32 and transistor 38 is biased to a non-conducting condition, the isolation of signal 26 from ground permits the timing capacitor 42 to begin charging from voltage source V' through resistor 43. For any given voltage V', the sizes of the timing capacitor 42 and the resistor 43 are chosen to permit adequate time t for the controlled process to be placed in a condition at which control can be returned to the programmer 12 during the time which the timing capacitor 42 is being charged to the voltage required as the threshold voltage signal 26 to produce an output signal 27 from the first comparator 25. Depending on the components used, time delays of as much as several minutes may take place before timing capacitor 42 is charged sufficiently to produce the required threshold voltage signal 26. Time delays of as much as 30 minutes have been achieved with the illustrated preferred embodiment of the invention.

As soon as the threshold voltage signal 26 exceeds the reference voltage between resistors 21 and 22, the first comparator 25 will produce an output signal 27. The flipflop 30 will be set to its first position, and the output 36 of the flipflop will cause the output stage 40 of the timer to cease producing the timed output signal voltage 15 and to ground the output of the timing circuit. The output signals 17a, 17b, 17c, and 17d of NAND circuits 61, 62, 63, and 64 will no longer be grounded, thereby turning off the alarm signal of light emitting diode 81 and returning control of the process to the programmer 12. Upon the setting of the flipflop 30 to its first position, the output signal 36 of the flipflop 30 also biases the transistor 38 to a conducting condition and the timing capacitor 42 is discharged through transistor 38 to ground in preparation for subsequent operation of the timing circuit as necessary.

If, during the charging of timing capacitor 42, it is determined that the controlled process is in, or has been returned to, a state permitting return of process control to the programmer 12, return of control to the programmer 12 can be accomplished by closing the reset switch 56. Closing of the reset switch 56 causes resistors 53 and 54 to be placed in series between the voltage V and ground. The bias voltage between resistors 53 and 54 is applied to the base of transistor 51 and causes transistor 51 to be put in a conducting condition. The size of the resistor 52 connected to the collector of transistor 51 is selected so that the voltage V will quickly charge the timing capacitor 42, through transistor 51 and resistor 52, to a voltage at or in excess of the required threshold voltage signal 26. Responsive to the timing capacitor 42 becoming charged to the threshold voltage 26, control of the process will be returned to the programmer 12 and the timing circuit will be readied for subsequent operation as has been previously described.

A diode 91 is connected between the ungrounded side of the reset switch 56 and the output of NAND circuit 64. The diode 91 is biased to insure a proper bias on the base of transistor 51 when the output of NAND circuit 64 is not grounded and to prevent noise signals or static charges from causing unwanted interference with the operation of the reset circuit 19.

In order to permit timing of relatively short power interruptions and still permit the trigger capacitor 46 of the trigger circuit 18 to provide the required low voltage trigger signal 33 for a period of time adequate to insure proper triggering of the timing circuit, resistor 49 and diode 48 are placed in parallel with resistor 45. The diode 48 is biased so that the trigger capacitor 46 can rapidly discharge through both resistor 45 and resistor 49 when a power interruption occurs. The diode 48 then prevents current flow through resistor 49 when the power supply is returned, causing the trigger capacitor 46 to recharge through resistor 45 only. The size of resistor 49 is chosen so that any power interruption which could possibly cause resetting of a counter, loss of digital information, or any other significant error in the programmer 12 will also cause the trigger capacitor 46 to discharge sufficiently to generate the required low voltage trigger signal 33.

Because the second comparator 32 compares a voltage supplied by a series of resistors between the power supply voltage V and ground with the voltage across the trigger capacitor 46, it is possible, when the same voltage supply is used for the trigger circuit 18 and the timing circuit 14, for the apparatus to trigger even though the power interruption is so short that the voltage V never drops to 0. For example, any drop in supply voltage V which results in a voltage V lower than the normal reference voltage between resistors 22 and 23 supplied to the second comparator 32 can cause triggering of the timing circuit. The return of the voltage V to its normal level will immediately cause the reference voltage between resistors 22 and 23 to return to its normal level whereas the triggers capacitor 46, while discharged almost immediately to the lowest level reached by the voltage V during the voltage drop, will recharge more slowly and will cause the required low voltage trigger signal 33 to be present and to trigger the timing circuit 114.

When it is desirable to ignore certain very short or relatively minor power interruptions or voltage drops which would have no effect on the particular programmer 12 being used, the size of resistor 49 may be selected so that a trigger voltage signal 33 will not be present unless the power interruption is of sufficient length to permit discharge of the trigger capacitor 46 through resistors 45 and 49 to a sufficiently low voltage during the duration of the power interruption.

The invention as described is therefore adaptable to provide accurate programmer interruption and override capabilities under a variety of power interruption conditions as desired. If a momentary power disturbance in the AC line, for example, would result in a counting device within the programmer 12 losing one-sixtieth or one-thirtieth of a second but would not present an interruption significant enough to cause a loss of count of a loss of memory, the timer 14 and trigger circuit 18 could be matched in a manner to prevent such a disturbance from overriding the programmer 12. On the other hand, since disturbances or power loss having a duration of as little as a fraction of a second can cause errors within digital equipment, the timer 14 and the trigger circuit 18 of the invention can be matched to respond to power disturbances which would not trigger conventional power interruption detectors.

Components which may be utilized in constructing the apparatus and performing the method of this invention for use in conjunction with a digital programmer such as the one disclosed in U.S. Pat. No. 3,732,466 are as follows:

| | |
|---|---|
| V | 5.4 volts |
| V' | 15 volts |
| Timer circuit | NE 555 Signetics |
| NAND circuits | MC 858 P Motorola |
| Timing capacitor 42 | 200 MFD |
| Resistor 43 | 1.1 meg ohms per minute time delay desired |

-Continued

| | |
|---|---|
| Capacitor 44 | 0.01 MFD |
| Resistor 45 | 470 K |
| Trigger capacitor 46 | 10 MFD |
| Diode 48 | 1 N 914 |
| Resistor 49 | 1 K |
| Transistor 51 | 215087 |
| Resistor 52 | 470 ohms |
| Resistor 53 | 470 ohms |
| Resistor 54 | 1.5 K |
| Light emitting diode 81 | MY 5023 Monsanto |
| Resistor 80 | 270 ohms |
| Resistor 83 | 4.7 K |
| Resistor 84 | 4.7 K |
| Resistor 85 | 4.7 K |

Reasonable variations and modifications are possible within the scope of the foregoing disclosure and the appended claims to the invention.

We claim:

1. Apparatus for altering a process control system in response to an interruption in the supply of electrical power to said process control system, said apparatus comprising:
   a timing means having trigger input means for accepting a preselected trigger signal and timed output means for producing a timed output signal of preselected duration in response to said preselected trigger signal,
   trigger signal generatng means for sensing an interruption in power provided by a first power supply means to said process control system and generating said preselected trigger signal in response to the termination of said interruption, and
   process control system override means for overriding at least a portion of said process control system in response to, and for the duration of, said timed outpt signal.

2. Apparatus in accordance with claim 1 wherein said first power supply means provides power for operating said trigger signal generating means and said timing means.

3. Apparatus in accordance with claim 2 wherein said timing means comprises a timing capacitor which begins charging in response to receipt of said preselected trigger signal at said trigger input means of said timing means and which, upon charging to a preselected threshold voltage, causes said timed output signal to terminate.

4. Apparatus in accordance with claim 3 wherein power for charging said timing capacitor is provided by a second power supply means and wherein power for operating the remainder of said timing means is provided by said first power supply means.

5. Apparatus in accordance with claim 3 wherein said first power supply means is a first DC power supply, wherein said trigger signal generating means comprises a trigger capacitor connected in series with a first resistor with the series combination of said first resistor and said trigger capacitor being connected between the positive and negative terminals of said first DC power supply, wherein said trigger input means of said timing means is connected to the common connection between said first resistor and said trigger capacitor, and wherein said preselected trigger signal comprises the voltage across said trigger capacitor being less than a preselected voltage.

6. Apparatus in accordance with claim 5 wherein said trigger signal generating means additionally comprises a first diode in series with a second resistor, with the series combination of said first diode and said second resistor being connected in parallel with said first resistor and with the polarity of said first diode being selected to prohibit charging of said trigger capacitor through said second resistor and to permit discharging of said trigger capacitor through said second resistor.

7. Apparatus in accordance with claim 6 additionally comprising reset means for increasing the rate at which said timing capacitor charges to said threshold voltage.

8. Apparatus in accordance with claim 7 wherein power for charging said timing capacitor is provided by a second DC power supply.

9. Apparatus in accordance with claim 8 additionally comprising output signal conditioning means for accepting said timed output signal and generating an inverted signal suitable for operating said process control system override means.

10. Apparatus in accordance with claim 9 wherein said timed output signal is a substantially constant voltage of preselected duration with said timed output means being at substantially ground potential when said timed output signal is not being produced and wherein said inverted signal is at substantially ground potential during the time that the constant voltage of said timed output signal is supplied to said output signal conditioning means, with said inverted signal being a substantially constant voltage when said first DC power supply is activated and said timed output means is grounded.

11. Apparatus in accordance with claim 2 wherein said process control system comprises a digital programmer.

12. Apparatus in accordance with claim 11 wherein said digital programmer is in control of at least one chromatographic analyzer and wherein said process control system override means comprises means for preventing delivery of a sample to said at least one chromatographic analyzer, means for backflushing the sample column of said at least one chromatographic analyzer, and means for resetting said digital programmer.

13. A method for altering a process control system in response to an interruption in the supply of electrical power to said process control system by a first power supply means, said method comprising:
generating a trigger signal in response to the return of electrical power to said process control system at the end of a power interruption,
producing a timed output signal in response to said trigger signal,
overriding at least a portion of said process control system in response to, and for the duration of, said timed output signal.

14. A method in accordance with claim 13 wherein generating said trigger signal comprises at least partially discharging a trigger capacitor in response to a power interruption of preselected magnitude or duration, recharging said trigger capacitor in response to the return of power to said process control system.

15. A method in accordance with claim 14 wherein producing said timed output signal comprises
comparing the voltage across said trigger capacitor to a reference voltage and beginning production of said timed output signal in response to said voltage across said trigger capacitor being less than said reference voltage.

16. A method in accordance with claim 15 wherein discharging said trigger capacitor is accomplished at a faster rate than recharging said trigger capacitor.

17. A method in accordance with claim 16 wherein said reference voltage is generated by dividing the voltage supplied by said first power supply means utilizing a plurality of resistors connected in series across said first power supply means and utilizing the voltage between two of said plurality of resistors as said reference voltage.

18. A method in accordance with claim 17 wherein the duration of said timed output signal is determined by the time required to charge a timing capacitor to a preselected threshold voltage utilizing a second power supply means as a voltage source for charging said timing capacitor and wherein overriding at least a portion of said process control system comprises resetting a digital programmer which controls the operation of at least one chromatographic analyzer backflushing the sample column of said analyzer and inhibiting the taking of additional samples by said analyzer during the production of said timed output signal, said method additionally comprising returning control of said at least one chromatographic analyzer to said programmer when said timing capacitor has charged to said preselected threshold voltage.

* * * * *